United States Patent
Shah et al.

(10) Patent No.: US 12,143,756 B2
(45) Date of Patent: Nov. 12, 2024

(54) MULTI-CAMERA PERSON RE-IDENTIFICATION

(71) Applicant: Target Brands, Inc., Minneapolis, MN (US)

(72) Inventors: Tapan Shah, Karnataka (IN); Ramanan Muthuraman, Karnataka (IN); Nicholas Scott Eggert, Inver Grove Heights, MN (US)

(73) Assignee: Target Brands, Inc., Minneapolis, MN (US)

( * ) Notice: Subject to any disclaimer, the term of this patent is extended or adjusted under 35 U.S.C. 154(b) by 85 days.

(21) Appl. No.: 17/497,532

(22) Filed: Oct. 8, 2021

(65) Prior Publication Data

US 2023/0112584 A1    Apr. 13, 2023

(51) Int. Cl.
*H04N 7/18* (2006.01)
*G06T 7/246* (2017.01)
*G06T 7/73* (2017.01)

(52) U.S. Cl.
CPC ............ *H04N 7/188* (2013.01); *G06T 7/246* (2017.01); *G06T 7/73* (2017.01); *H04N 7/181* (2013.01); *G06T 2207/10016* (2013.01)

(58) Field of Classification Search
CPC ........ H04N 7/188; H04N 7/181; G06T 7/246; G06T 7/73; G06T 2207/10016
USPC ........................................................ 348/143
See application file for complete search history.

(56) References Cited

U.S. PATENT DOCUMENTS

| | | | |
|---|---|---|---|
| 9,165,375 B2 | 10/2015 | Datta et al. | |
| 9,495,763 B1 * | 11/2016 | Chen | G06F 18/22 |
| 9,641,763 B2 | 5/2017 | Bernal et al. | |
| 9,665,777 B2 | 5/2017 | Naikal et al. | |
| 10,055,853 B1 * | 8/2018 | Fisher | G06V 10/454 |
| 10,133,933 B1 | 11/2018 | Fisher et al. | |
| 10,248,860 B2 | 4/2019 | Mai et al. | |
| 10,395,385 B2 * | 8/2019 | Zhou | G06T 7/70 |
| 10,614,318 B1 * | 4/2020 | Mirza | G06T 7/292 |
| 11,587,243 B2 * | 2/2023 | Crain | G01S 17/46 |
| 2012/0148103 A1 * | 6/2012 | Hampel | G06T 7/254 382/103 |
| 2015/0294496 A1 * | 10/2015 | Medasani | G06T 15/205 345/420 |
| 2016/0148390 A1 * | 5/2016 | Arambel | G06V 10/457 382/103 |

(Continued)

*Primary Examiner* — Christopher S Kelley
*Assistant Examiner* — Asmamaw G Tarko
(74) *Attorney, Agent, or Firm* — Merchant & Gould P.C.

(57) ABSTRACT

A system may track a person at a location across multiple cameras in real time, while maintaining identification of the person through their visit. The person may not be personally identified; however, the person's presence in video frames captured by different cameras may be linked together. The linked frames may be evaluated by one or more analytics applications. For example, an analytics application may determine a trajectory of a person through a location and plot an overlay of that person's trip through the location on the map. This information may be used, for example, to optimize store layout, asset protection purposes, for counting a number of people at the location at a given time (e.g., for understanding busy hours of the location), determining whether social distancing or other health and/or safety measures may be in compliance, etc.

18 Claims, 10 Drawing Sheets

(56) References Cited

U.S. PATENT DOCUMENTS

| | | | | |
|---|---|---|---|---|
| 2016/0232073 | A1* | 8/2016 | Cook | G06F 11/3065 |
| 2018/0374239 | A1* | 12/2018 | Wallack | H04N 23/90 |
| 2019/0294889 | A1* | 9/2019 | Sriram | G06V 10/764 |
| 2020/0265240 | A1* | 8/2020 | Shekhar | G06V 20/52 |
| 2020/0334466 | A1* | 10/2020 | Zhou | G06V 10/764 |
| 2021/0124927 | A1* | 4/2021 | Mirza | G06T 7/248 |
| 2021/0124937 | A1* | 4/2021 | Mirza | G06T 7/292 |
| 2021/0124951 | A1* | 4/2021 | Mirza | G06V 40/107 |
| 2021/0124953 | A1* | 4/2021 | Mirza | G06T 7/215 |
| 2021/0125258 | A1* | 4/2021 | Mirza | G06Q 30/0633 |
| 2021/0125341 | A1* | 4/2021 | Mirza | G06T 7/13 |
| 2021/0125345 | A1* | 4/2021 | Mirza | G06T 7/246 |
| 2021/0125346 | A1* | 4/2021 | Mirza | G06T 7/60 |
| 2021/0125347 | A1* | 4/2021 | Krishnamurthy | G06Q 30/0601 |
| 2021/0125352 | A1* | 4/2021 | Mirza | G06T 7/246 |
| 2021/0125360 | A1* | 4/2021 | Nguyen | G06V 20/653 |
| 2021/0150256 | A1* | 5/2021 | Mirza | G06V 20/40 |
| 2021/0158051 | A1* | 5/2021 | Dalal | G06T 7/292 |
| 2021/0289171 | A1* | 9/2021 | Sarkar | H04N 7/183 |
| 2021/0343027 | A1* | 11/2021 | Huang | G06T 7/74 |
| 2022/0174240 | A1* | 6/2022 | Hseush | G06T 7/292 |
| 2022/0198684 | A1* | 6/2022 | Fang | G06V 20/42 |
| 2022/0309767 | A1* | 9/2022 | Keefe | G06T 7/277 |
| 2022/0358670 | A1* | 11/2022 | Miettinen | G02B 27/0093 |
| 2022/0383512 | A1* | 12/2022 | Miettinen | G06F 3/013 |
| 2022/0383522 | A1* | 12/2022 | Lai | G06T 7/292 |

* cited by examiner

MULTI-CAMERA PERSON RE-IDENTIFICATION

BACKGROUND

In our current data driven world, retailers and other service providers may want to use technology to better understand their customers for a variety of objectives. Some example objectives may include to gain valuable business insights, to maximize operational efficiency, and/or to avoid asset loss or theft.

In a retail operation, a retailer may want to understand a customer's shopping behaviors during a shopping session. For example, when a customer uses an online platform, the retailer may be able to collect and analyze data associated with various types of interactions performed by the customer with items during the online shopping session to understand the customer's online shopping behaviors. However, when a customer visits a retail location, in-store shopping behavior information collected and analyzed by the retailer may be limited to transaction data and purchase information. For example, customer interaction data and other in-store shopping behavior information, which may be useful for a variety of business use cases and/or security improvements, may not be easily obtained or available in a format that may be analyzed for the various business and/or security uses.

SUMMARY

In summary, the present disclosure relates to methods, systems for identifying a person at a location across multiple camera systems. For example, tracking a person at a location across multiple cameras, while maintaining identification of the person through their overall visit at the location, is provided. Specifically, while the person may not be personally identified, the person's presence in video captured by different cameras from different perspectives may be linked together. Linked tracks of video data of the person may be stored and analyzed for a variety of applications.

Various aspects are described in this disclosure, which include, but are not limited to, the following aspects.

In one aspect, a system for providing person re-identification and tracking includes at least one processor and a memory coupled to the at least one processor. The memory includes instructions that when executed by the at least one processor cause the system to: obtain image data from a first camera of a plurality of cameras at a location, wherein the image data include a set of video frames captured by the first camera; detect a person in at least one of the video frames; and create a bounding box to include the detected person. The instructions further cause the system to track the bounding box across the set of video frames captured by the first camera; store the tracked bounding boxes and information associated with the tracked bounding boxes as a camera-specific track; and determine whether the camera-specific track matches a global track comprised of one or more other camera-specific tracks captured by at least one of the plurality of cameras at the location. When the camera-specific track matches a global track, the instructions cause the system to link the camera-specific track to the global track and reset an expiration time associated with the global track. When the camera-specific track does not match a global track, the instructions cause the system to create a new global track and set the expiration time for the new global track. When the expiration time is expired, the global track is stored in a data store.

In another aspect, a method for providing person re-identification and tracking includes obtaining image data from a first camera of a plurality of cameras at a location, wherein the image data include a set of video frames captured by the first camera, and detecting a person in at least one of the video frames. The method further includes creating bounding box to include the detected person; tracking the bounding box across the set of video frames captured by the first camera; storing the tracked bounding boxes and information associated with the tracked bounding boxes as a camera-specific track; and determining whether the camera-specific track matches a global track comprised of one or more other camera-specific tracks captured by at least one of the plurality of cameras at the location. When the camera-specific track matches a global track, the method includes linking the camera-specific track to the global track and reset an expiration time associated with the global track. When the camera-specific track does not match a global track, the method includes creating a new global track and setting the expiration time for the new global track. When the expiration time is expired, the method includes storing the global track in a data store.

In another aspect, a computer readable storage medium including executable instructions which, when executed by a processor, cause the processor to perform: obtaining image data from a first camera of a plurality of cameras at a location, wherein the image data include a set of video frames captured by the first camera; detecting a person in at least one of the video frames; creating bounding box to include the detected person; tracking the bounding box across the set of video frames captured by the first camera; storing the tracked bounding boxes and information associated with the tracked bounding boxes as a camera-specific track; and determining whether the camera-specific track matches a global track comprised of one or more other camera-specific tracks captured by at least one of the plurality of cameras at the location. The instructions further cause the processor to perform, when the camera-specific track matches a global track, linking the camera-specific track to the global track and reset an expiration time associated with the global track. The instructions further cause the processor to perform, when the camera-specific track does not match a global track, creating a new global track and setting the expiration time for the new global track. The instructions further cause the processor to perform, when the expiration time is expired, storing the global track in a data store.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
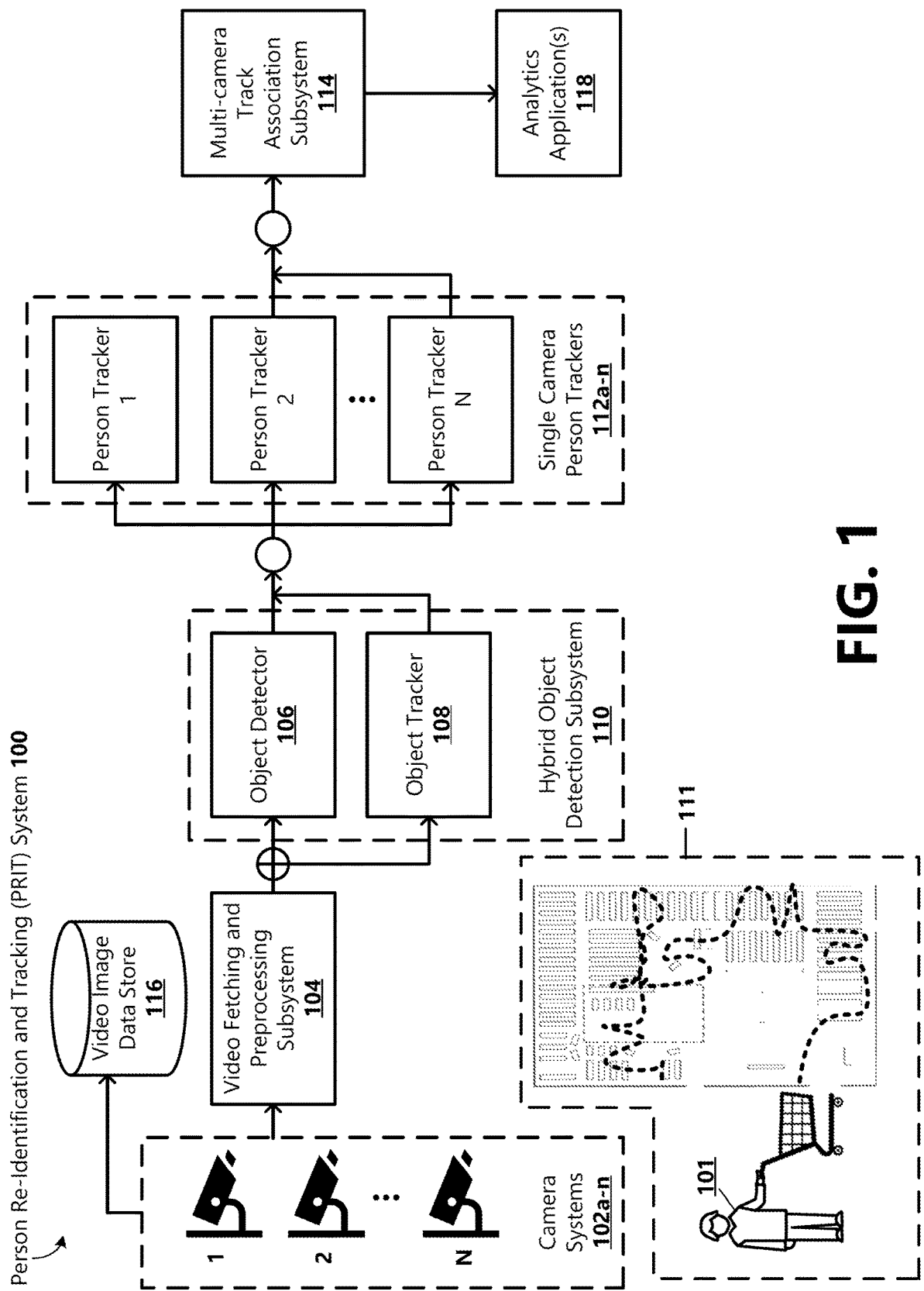
FIG. 1 is a block diagram illustrating an example system that may be implemented for providing person re-identification and tracking.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

As briefly described above, the present disclosure describes providing person re-identification and tracking. Aspects of the disclosed person re-identification and tracking system, for example, may be used by an enterprise that may want to track people at a location across multiple camera fields of view, while maintaining identification of each person through that person's overall visit to the location. Specifically, while the person may not be personally identified, the person's presence in video captured by different cameras from different perspectives may be linked together. Linked tracks of video may be used, for example, to determine a trajectory of a given person through the location for the duration of the person's visit at the location. According to one example implementation, linked tracks of video frames may be used to determine a trajectory of a person (e.g., a customer) through a retail location during an in-store shopping session. For example, customers' trajectories may be plotted as an overlay on a map of the retail location. This information may be used, for example, to optimize layout of, e.g., items and shelving at the retail location. Additionally, trajectory information may be used for asset protection purposes, or for counting a number of unique persons at a location at a given time, to understand busy hours of the location, heavily trafficked areas, to understand effects of a marketing campaign, new layout, staffing, etc. Although examples are presented primarily regarding the retail industry, these are presented as non-limiting examples, as enterprises in other goods, services, sports, healthcare, educational, professional, recreational, and other industries may also make use of the present disclosure.

FIG. 1 is a block diagram illustrating an example person re-identification and tracking system 100 that may be implemented for providing person re-identification and tracking (PRIT). For example, the PRIT system 100 may include a plurality of camera systems 102a-n (generally, cameras 102), a video fetching and preprocessing subsystem 104, a hybrid object detection subsystem 110 (which, in some examples, may include an object detector 106 and an object tracker 108), a plurality of single camera person trackers 112a-n (generally, 112), and a multi-camera track association subsystem 114 communicatively connected over a network or a combination of networks. Non-limiting examples of networks can include the Internet, an intranet, an extranet, a local-area network, a wide-area network, an edge network, wired networks, wireless networks, and combinations thereof.

The cameras 102 may be positioned at different positions within a location 111. As an example, the cameras 102 may operate as part of a security system at a retail location 111, wherein the cameras 102 may be positioned within and have fields of view encompassing respective parts of the retail location 111. The cameras 102 may operate to obtain image data associated with their field of view and communicate the image data to one or more other subsystems. The image data may include a plurality of video frames captured in sequence according to a frame rate. For example, image data may capture an image of a person 101 or multiple people 101 in any given video frame. In some examples, at least two cameras 102a,b may have overlapping fields of view, where an image of a person 101 may be captured concurrently by the at least two cameras 102a,b. In other examples, at least two cameras 102a,b may be positioned to have adjacent fields of view, where an image of a person 101 may be captured by a first camera 102a and then subsequently captured by a second camera 102b. In some examples, the image data captured by the cameras 102 may be collected by the video fetching and preprocessing subsystem 104. In some examples, the image data captured by the cameras 102 may further be stored in a video image data store 116.

In general, the PRIT system 100 may operate to track a person 101 at a location 111 across multiple cameras 102, while maintaining identification of the person 101 through that person's overall visit at the location 111. Specifically, while the person 101 may not be personally identified, that person's presence in video frames captured by different cameras 102 from different perspectives may be linked together. This may be evaluated, for example, by one or more analytics applications 118 included in or in communication with the PRIT system 100. For example, the one or more analytics applications 118 may operate to determine a trajectory of a person 101 through a location 111 and plot an overlay of that person's trip through the location 111 on the map. This information may be used, for example, to optimize store layout, asset protection purposes, for counting a number of people at the location 111 at a given time (e.g., for understanding busy hours of the location 111), determining whether social distancing or other health and/or safety measures may be in compliance, etc.

According to an example, the PRIT system 100 may operate to provide person re-identification and tracking by fetching and preprocessing video frames from a plurality of cameras 102 and storing the video frames in a queue. The hybrid object detection subsystem 110 may use the object detector 106 to detect people 101 and place bounding boxes around them in video frames. In some examples, the bounding boxes may be passed to an object tracker 108 that may operate to track detected people 101 from a previous video frame and for a series of frames.

According to an example, for a single camera 102, a deep sort algorithm may be used to track people 101 and identify them within the location 111. A convolutional neural network may be used that extracts visual features from a detected bounding box, and a Kalman filter may be used to predict a person's speed and direction to correctly correlate a person 101 in a current frame with the same person in a previous frame. For example, if visual features are matched, an ID of the previous frame may be assigned to the current bounding box. If the visual features are not matched, a new ID may be generated and assigned.

In some examples, for multiple cameras, information from the single camera person trackers 112 may be used. Specifically, track information from a plurality of single camera person trackers 112 may be obtained, and the track information may be matched across the cameras 201. Each local track may be added to a collection of global tracks, and local tracks may be compared to the global tracks using a visual feature matching algorithm. If the features match between a particular local track and a global track, the local track may be added to the global track by assigning a global ID to the local track that matches the global ID of the global track. If the local track does not match any existing global tracks, the matching limit may be reached, and a new ID may be added to the global track database including the local track. Periodically, global tracks may be removed from the global track collection and written to a large data store.

According to examples, the cameras 102, video fetching and preprocessing subsystem 104, hybrid object detection subsystem 110, single camera trackers 112, multi-camera track association subsystem 114, analytics applications 118, and other components in the PRIT system 100 may be implemented using one or a combination of computing devices that include at least one processor and a memory coupled to the at least one processor, the memory including instructions that when executed by the at least one processor operate to perform one or more operations associated with re-identifying and tracking a person 101 at a location 111 across multiple cameras 102. Non-limiting examples of computing devices include servers, workstations, checkout POS units, desktop computers, laptop computers, mobile phones, tablets, smart devices, gaming devices, wearable devices, databases, etc. Further details of the computing devices and variations thereof can be found in FIG. 7. According to one example, the PRIT system 100 may be implemented at an enterprise, such as a retail enterprise that offers goods and/or services, also referred to herein as items, to users. Example components of the PRIT system 100 and methods performed in association with re-identifying and tracking a person 101 at a location 111 across multiple camera systems 102a-n are described in further detail below with reference to FIGS. 2-10.

Figure 2:
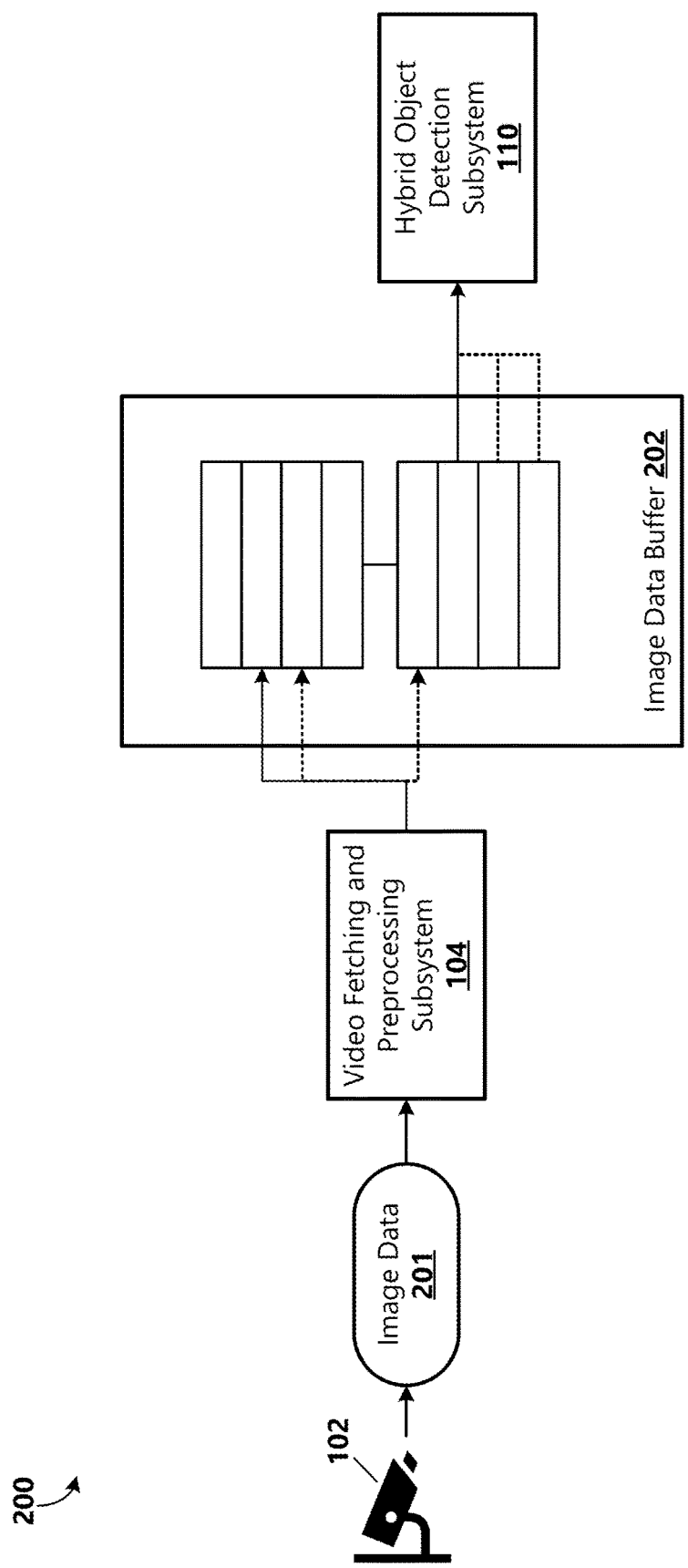
FIG. 2 is a block diagram is illustrated depicting an example process for collecting and storing image data for consumption by the hybrid object detection subsystem in a next process as part of providing person re-identification and tracking.

With reference now to FIG. 2, a block diagram is illustrated depicting an example process 200 for collecting and storing image data 201 for consumption by the hybrid object detection subsystem 110 in a next process as part of providing person re-identification and tracking. For example, the video fetching and preprocessing subsystem 104 is illustrative of a software module, system, or device that may be operative or configured to receive image data 201 from a camera system 102. In one example, the image data 201 may include a series of video frames captured by a camera 102. The image data 201 may include captured images of one person 101 or a plurality of people 101.

In some examples, the video fetching and preprocessing subsystem 104 may operate on an independent thread. In some examples, the video fetching and preprocessing subsystem 104 may operate to receive image data 201 from all the cameras 102 included at the location 111. In other examples, multiple video fetching and prepressing subsystems 104 may operate to fetch image data 201 from a subset of the plurality of cameras 102 included at the location 111. In some examples, the video fetching and preprocessing subsystem 104 may be configured to fetch or otherwise receive video frames from the cameras 102 at a preconfigured frame limit. In some examples, the video fetching and preprocessing subsystem 104 may operate to receive video frames at the same or near the frame rate of the camera 102 (e.g., 10, 20, 30 frames per second). That is, in some examples, the video fetching and preprocessing subsystem 104 may operate in real time or near-real time.

In some examples, the image data 201 may be stored in a queue (i.e., image data buffer 202), where the video frames may be ready for consumption by a next process (e.g., object detection and tracking performed by the hybrid object detection subsystem 110). In some implementations, if the image data 201 are not consumed as quickly as the data are being stored in the image data buffer 202, the video fetching and preprocessing subsystem 104 may operate to overwrite a portion of the image data 201. For example, the video fetching and preprocessing subsystem 104 may be configured to overwrite older image data 201, when needed, to enable real time or near-real time processing of the image data 201.

Figure 3:
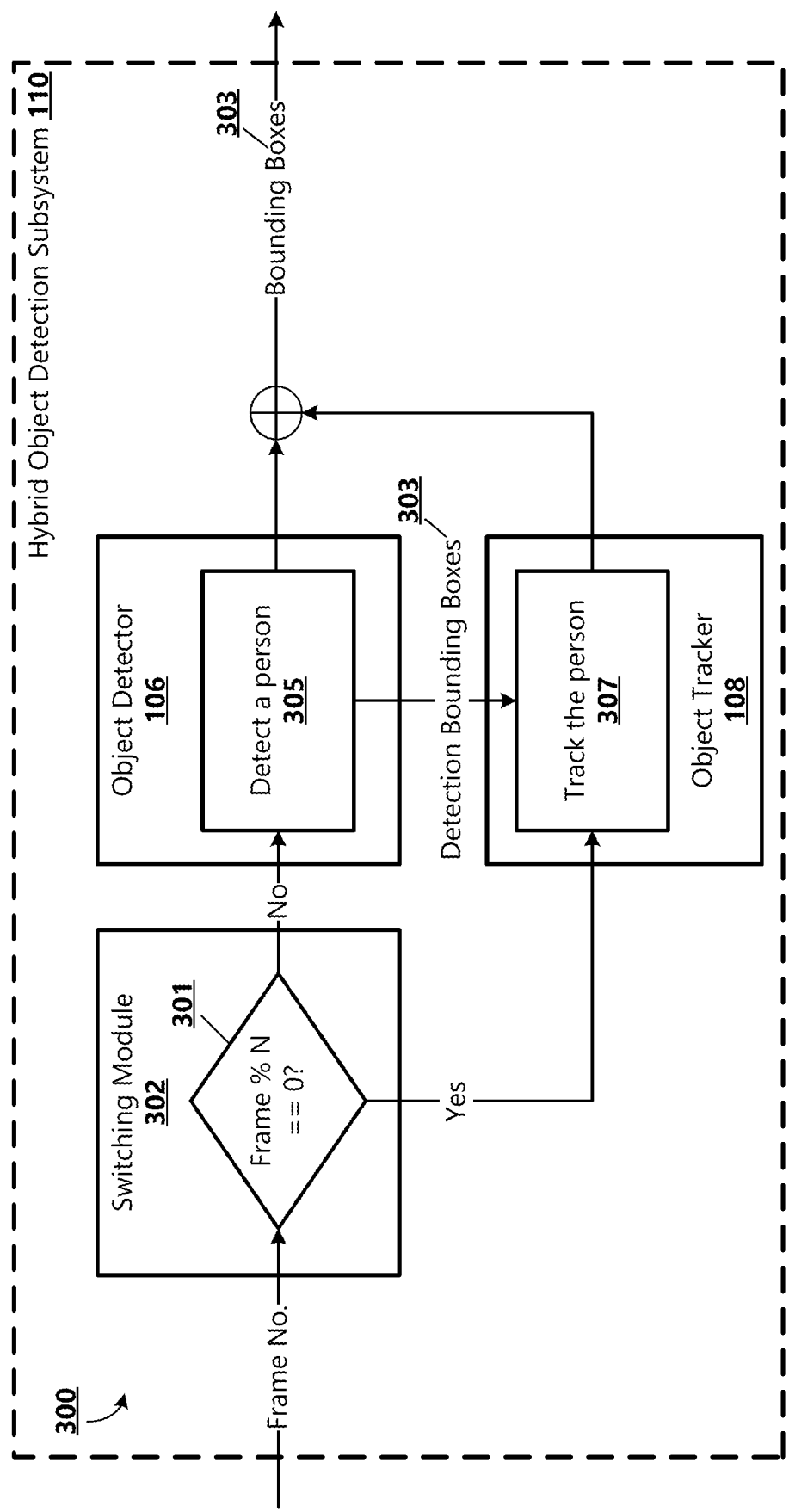
FIG. 3 is a block diagram is illustrated depicting an example process for detecting and tracking a person as part of providing person re-identification and tracking.

With reference now to FIG. 3, a block diagram is illustrated depicting an example process 300 for detecting and tracking a person 101 as part of providing person re-identification and tracking. For example, the hybrid object detection subsystem 110 is illustrative of a software module, system, or device that may be operative or configured to use a hybrid object detection and tracking method to minimize processing time for object detection, for example, to reduce processing time to achieve real time or near-real time operation. According to examples, the hybrid object detection subsystem 110 may include an object detector 106 and an object tracker 108.

In some examples, a switching module 302 may operate to increase speed of detection and tracking while maintaining a desired level of accuracy for real time or near-real time application by determining (OPERATION 301) when to alternate the processing of a number of video frames between the relatively slow and computationally more expensive but more accurate object detector 106 and the faster but potentially less accurate object tracker 108. For example, the switching module 302 may determine when to detect a person 101 and when to track a person 101. In some examples, the switching module 301 may be tunable to optimize processing time and/or accuracy.

In some examples, the object detector 106 may include a deep learning model that may operate to perform deep-learning inference applications, such as object/person 101 detection (OPERATION 305). For example, the object detector 106 may be configured to evaluate image data 201 to detect at least one person 101 captured in a first video frame based on a set of preconfigured metrics and values corresponding to a person classification, generate one or more bounding boxes 303 to include each detected person 101, and to pass bounding box 303 information to a tracker. According to one example, the bounding box 303 information for a detected person 101 may include coordinates (e.g., $x_{min}$, $y_{min}$, $x_{max}$, $y_{max}$) of the bounding box 303 in the video frame, a camera 102 ID, an video frame ID, and a timestamp associated with the video frame.

Alternatively, in some examples, the object tracker 108, may be used to track (OPERATION 307) a person 101 detected by the object detector 106 in a first video frame and to further track the detected person 101 for a series of subsequent video frames. In some examples, the object tracker 108 may use a Kernelized Correlation Filter (KCF) tracker, which, as known in the art, may provide benefits of computational efficiency. In some examples, the object tracker 108 may be configured to receive bounding box 303 information associated with a detected person 101 and to track movement of the same bounding box 303 in additional video frames.

Figure 4:
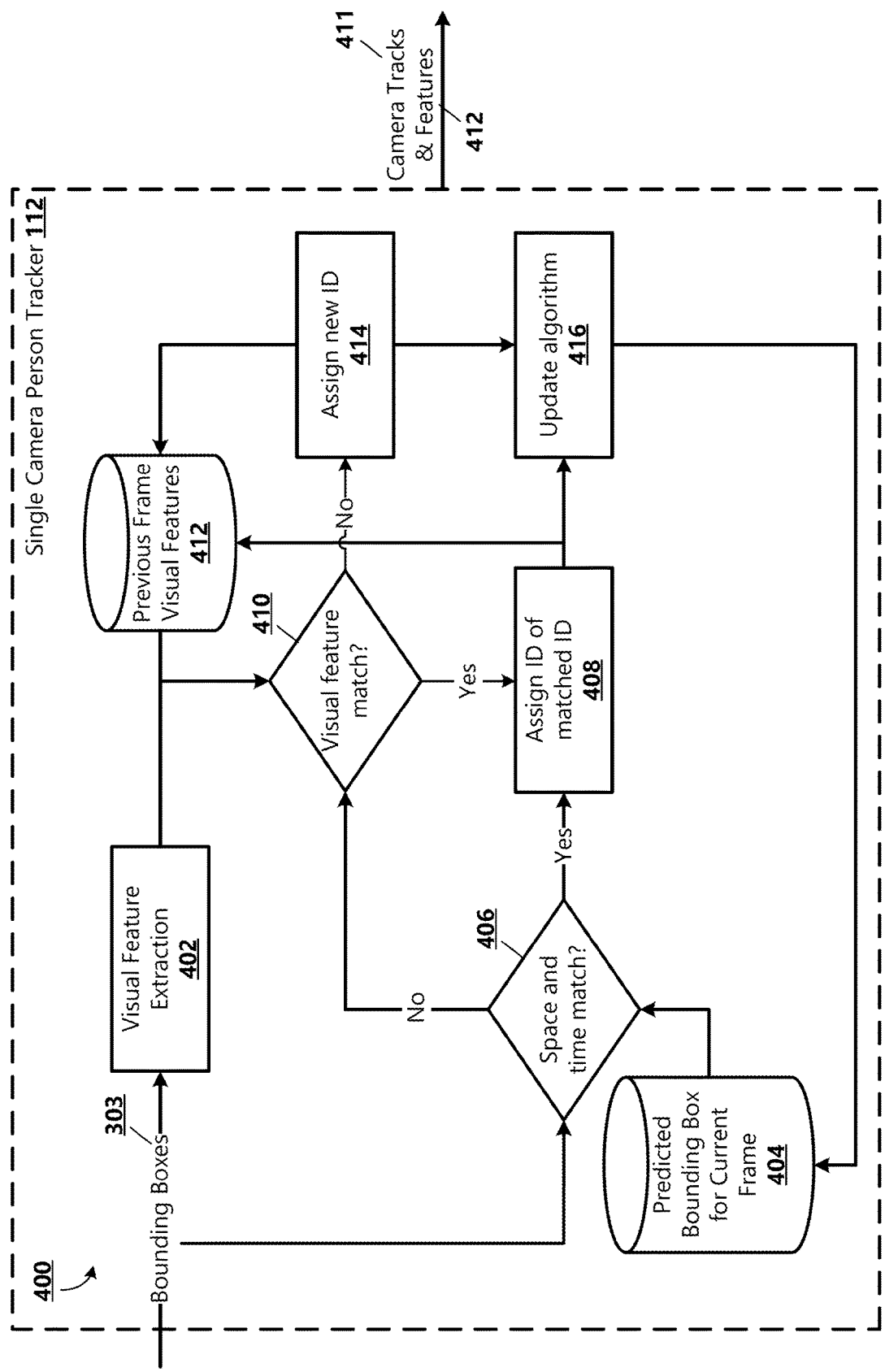
FIG. 4 is a block diagram is illustrated depicting an example process for identifying and tracking a person as part of providing person re-identification and tracking.

With reference now to FIG. 4, a block diagram is illustrated depicting an example process 400 for identifying and tracking a person 101 as part of providing person re-identification and tracking. For example, the one or more single camera person trackers 112 are illustrative of a software module, system, or device that may be operative or configured to track a person 101 and identify (according to a non-personal identifiable ID) the person 101 within the location 111. In some examples, the single camera person tracker 112 may operate to receive bounding box 303 information from the hybrid detection subsystem 110 and to perform a visual feature extraction process (OPERATION 402) to extract visual features from the bounding box 303. According to one example implementation, the single camera person tracker 112 may use a convolutional neural network (CNN) based deep learning algorithm that may be trained to extract a number of visual features (512 according to one example) from a video frame and to assign values to those features in order to differentiate one person 101 from another person 101.

In some examples, the single camera person tracker 112 may further operate to use a filtering algorithm, such as a Kalman filter algorithm, to predict a person's speed and direction to correctly correlate the person 101 in a current video frame with a person 101 in a previous frame. For example, the filtering algorithm may be able to determine a trajectory of the person 101 based on a bounding box 303 identified in a previous video frame, and based on the speed and direction of the trajectory, may determine a predicted bounding box 404 for a current video frame being evaluated by the single camera person tracker 112. At DECISION OPERATION 406, the bounding box 303 in a current video frame may be checked for space and time correlations with the predicted bounding box 404 determined for the current frame. When the predicted bounding box 404 and the current bounding box 303 have an overlap that satisfies an overlap threshold condition, the ID of the bounding box from the previous video frame and associated with the predicted bounding box 404 may be assigned to the bounding box 303 in the current frame at OPERATION 408.

Alternatively, when the predicted bounding box 404 and the current bounding box 303 do not have overlap or have overlap that does not satisfy the overlap threshold condition, at DECISION OPERATION 410, visual features 412 in the current bounding box 303 may be compared against visual features 412 in all bounding boxes 303 of the previous video frame. For example, visual features 412 extracted from image data 201 at OPERATION 402 may be stored in a library configured to store a set of extracted visual features 412 in association with an assigned ID. In some examples, the visual features 412 and ID may be stored in association with a camera-specific track 411 corresponding to the detected person 101. According to one example implementation, visual feature 412 matching may include generating a feature vector that may be evaluated to match visual features 412 based on a cosine distance and threshold.

If, at DECISION OPERATION 410, visual features 412 are matched, the ID of the matched bounding box 303 in the previous video frame may be assigned to the current bounding box 303 at OPERATION 408. For example, the current bounding box 303 information and visual features 412 information may be included in a camera-specific track 411 to be matched against visual features 412 extracted from a next video frame, if needed.

If visual features are not matched, a new ID may be created and assigned to the current bounding box 303 at OPERATION 414. Moreover, at OPERATION 416, the filtering algorithm may be updated based on the identified bounding box 303. For example, the filtering algorithm may be updated with speed and direction information related to tracking the bounding box 303, and a next predicted bounding box 404 may be determined for the next frame based on the updated information about the current bounding box 303.

Figure 5:
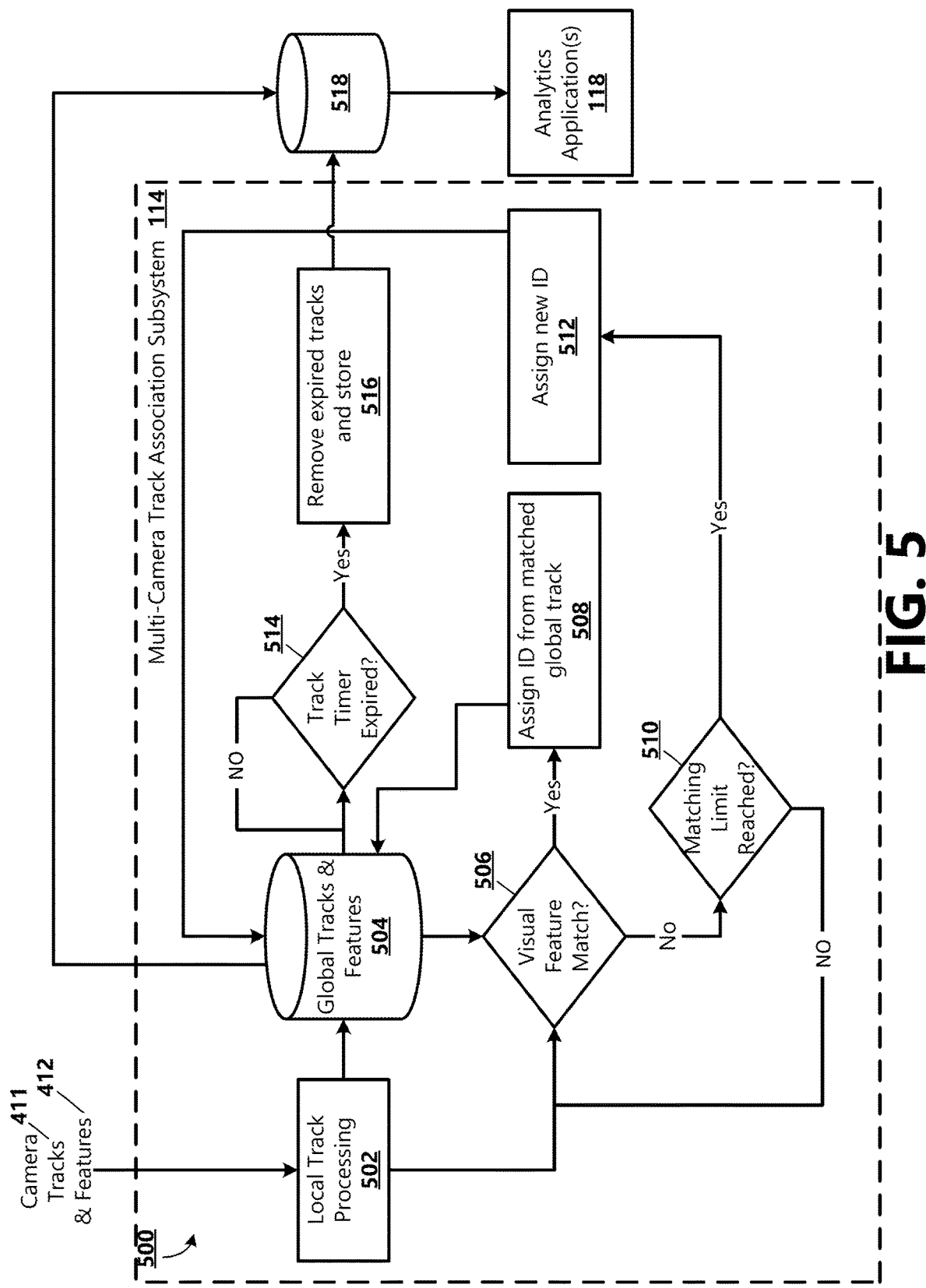
FIG. 5 is a block diagram is illustrated depicting an example process for matching camera-specific tracks using visual features as part of providing person re-identification and tracking.

With reference now to FIG. 5, a block diagram is illustrated depicting an example process 500 for matching camera-specific tracks 411 using visual features 412 as part of providing person re-identification and tracking. For example, the multicamera track association subsystem 114 is illustrative of a software module, system, or device that may be operative or configured to, at OPERATION 502, collect camera-specific tracks 411 and visual features 412 information from a plurality of single camera person trackers 112. For example, each camera-specific track 411 may be associated with its assigned ID, bounding box 303 coordinates, and visual features 412 information. The assigned ID or another identifier included in each camera-specific track 411 may include an indication of the video frame and the camera 102 that captured the video frame. In some examples, each received camera-specific track 411 and associated visual features 412 information may be added to collection of global tracks 504 and visual features 412. For example, the collection of global tracks 504 and visual features 412 may operate as a sliding window of candidate tracks to which a received camera-specific track 411 may be linked.

At DECISION OPERATION 506, the multicamera track association subsystem 114 may operate to match a camera-specific track 411 associated with a person 101 received from a first camera 102a to a global track 504 of the person 101. According to one example, the multicamera track association subsystem 114 may include multicamera combination logic that may operate to resolve matching tracks 411,504 based on location (e.g., space or distance) and time, visual features, and missing video frames of the person 101. For example, a camera-specific track 411 may be linked to a last-updated camera-specific track 411 included in a global track 504, wherein the last-updated camera-specific track 411 may be from a same camera 102 or another camera 102. The global track 504 may comprise a person's trajectory through the location 111, including when the person 101 may leave the field of view of one camera 102 and then re-enter the field of view of the same camera 102 or enter the field of view of a different camera 102. That is, the global track 504 and related visual features 412 information associated with a person 101 may be continually updated during the person's on-location visit to include a collection of camera-specific tracks 411 of the person 101 collected from at least one camera 102.

In some examples, the multicamera combination logic may include instructions that may operate to determine whether the person 101 in a camera-specific track 411 may correlate with a person 101 detected and tracked in a global track 504, for example, based on time and distance information associated with a bounding box 303 included in the camera-specific track 411 and a bounding box 303 included in the global track 504. For example, a determination may be made as to whether a person 101 could move from one location to the next within the delta time between two tracks. According to one example, if the camera-specific track 411 and the last-update to a global track 504 are associated with a same camera 102, a determination may be made as to whether the person 101 could move out of the field of view of the camera 102 and then move back into the field of view of the camera 102 in the delta time.

In some examples, the multicamera combination logic may further include instructions that may operate to determine whether the person 101 in a camera-specific track 411 may correlate with a person 101 detected and tracked in a global track 504, for example, based on the visual features 412 information associated with a bounding box 303 included in the camera-specific track 411 and a bounding box 303 included in the global track 504. For example, a determination may be made as to whether a set of visual features 412 may match another set of visual features 412 within a confidence level that they relate to a same person 101.

In some examples, matching criteria used to match the camera-specific tracks 411 and global tracks 503 may be configurable. In one example, the multicamera track association subsystem 114 may be configured to match any camera-specific track 411 with a global track 504 for N times, wherein if a match is determined as successful at least once, the camera-specific track 411 may be assigned a global ID associated with the matched global track 504 at OPERATION 508. If a camera-specific track 411 is not determined to match with a global track 504 when the matching limit N is reached at DECISION OPERATION 510, a new global ID may be assigned to the camera-specific track 411 at OPERATION 512.

In some examples, when more than one camera-specific track 411 is determined to match an existing global track 504, a linear sum assignment (LSA) algorithm may be used to determine an optimal match. For example, this logic may be utilized to ensure that if there are multiple camera-specific tracks 411 of the same person 101, they may be assigned to the same global track 504 in sequence.

In some examples, an expiration time (M) (e.g., 10 minutes) may be assigned to a global track 504 when an update is made to (e.g., including creation of) the global track 504. At DECISION OPERATION 514, a determination may be made that the expiration time (M) has passed since a last update of the global track 504, the global track 504 may be expired and removed from the collection of global tracks and features, and written to a large data store 518. For example, the expiration time may be utilized to allow a camera-specific track 411 to be matched and linked with a global track 504 even when there may be missing video frames within that expiration time limit, for example, due to: the tracked person 101 moving out of the field of view of a camera 102, such as when obstructed from the camera's view by another person 101, a shelf, or another object; when a region of the location 111 may not be in the field of view of any camera 102 (e.g., a dressing room region, a restroom region, or another region); or when a period of time may have passed when the person 101 may not have been recognized as the person being tracked with a satisfactory confidence level.

In some examples, the large data store 518 may be accessible to one or more analytics applications 118. According to one example, an analytics application 118 may operate as an asset protection or safety tool, wherein the analytics application 118 may be configured to access global track 504 information stored in the large data store 518 to track the a person's trajectory through the location 111 and/or to determine regions at the location 111 where the person 101 may have traveled. For example, the person's location information (e.g., bounding box 303 coordinates) may be linked to image data 201 of the person 101 that may be stored in the video image data store 116.

According to another example, the analytics application 118 may operate to overlay a person's location information on a store map. For example, an evaluation of one or a plurality of customer's trajectories through a retail location 111 may generate insights, such a count of people 101 visiting the location 111, durations of visits, high traffic times and visited areas, travel patterns, propensity and affinity metrics (e.g., in association with items offered for sale at the location 111, a remodel of the location 111, an advertising campaign), etc. For example, such insights may be utilized to optimizing retail location layout, for implementing health and/or safety measures, for adjusting staffing, etc.

Figure 6:
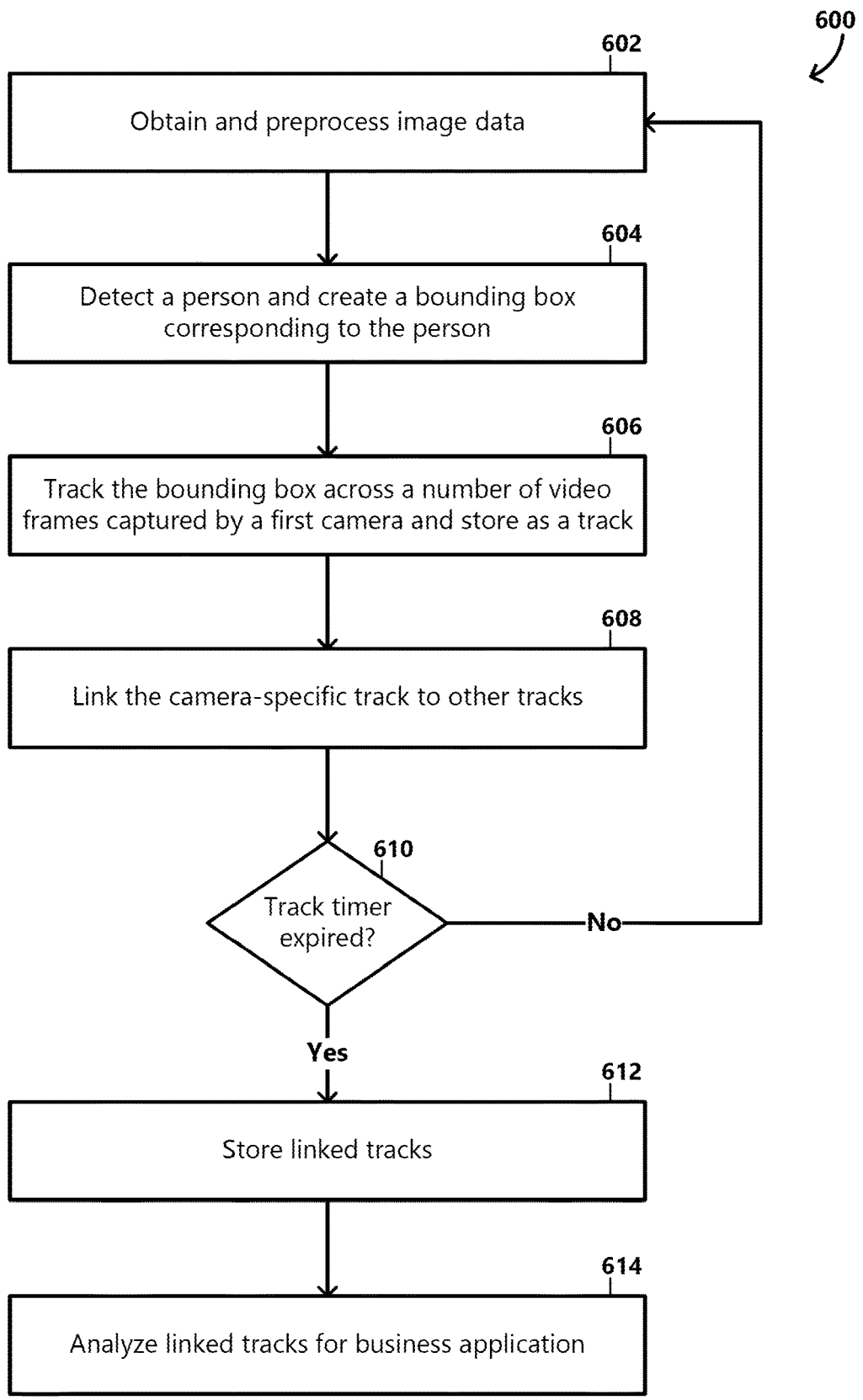
FIG. 6 is a flow chart depicting general stages of an example process or method for providing person re-identification and tracking.

In FIG. 6, a flow chart is shown depicting general stages of an example process or method 600 for providing person re-identification and tracking according to an embodiment. At OPERATION 602, image data 201 may be obtained from a camera 102, preprocessed, and stored in an image data buffer 202. As described above, the camera 102 may be one of a plurality of cameras 102 positioned throughout a location 111, such as a retail location 111, and the image data 201 may include a set of video frames captured by the camera 102 at a frame rate associated with the camera.

At OPERATION 604, image data 201 may be evaluated for detecting a person 101 in a video frame. In some examples, when a person 101 is detected in a video frame of a set of video frames, a bounding box 303 may be drawn to represent the person 101. For example, the bounding box 303 may include information such as location coordinates of the bounding box 303 corresponding to an area in the camera's field of view, and which may be further correlated to a position in the location 111. Other information may include a bounding box ID, an ID of the video frame, and an ID of the camera 102 that captured the video frame.

In some examples, the switching module 302 may be used to limit use of the more computationally-expensive object detector 106. For example, to optimize resource utilization and processing efficiency while maintaining a desired level of accuracy, the switching module 302 may be configured to switch computation of a number or percentage of video frames to the computationally-less expensive object tracker 108.

At OPERATION 606, the detected person 101 may be tracked, based on the person's associated bounding box 303, through the set of video frames. For example, the object detector 108 may track coordinates of the bounding box through the set of video frames, and the bounding box 303 information determined by the hybrid object detection subsystem 110 may be passed to a single camera person tracker 112. As described above, the single camera person tracker 112 may use a deep sort algorithm to track the person 101 and identify the person 101 through the set of video frames. In some examples, a convolutional neural network may be used to extract visual features 412 of the person 101 from the detected bounding box 303, and a filtering algorithm, such as a Kalman filter algorithm, may be used to predict the person's speed and direction to correctly correlate the person 101 in a current frame with the same person 101 in a previous frame. For example, if visual features 412 are matched, an ID of the previous frame may be assigned to the current bounding box 303 and linked as a camera-specific track 411. If the visual features are not matched, a new camera-specific track 411 and ID may be generated and assigned.

In some examples, tracking the bounding box 303 may further include tracking the bounding box 303 across image data 201 captured by multiple cameras in real time or near-real time. For example, camera-specific tracks 411 from a plurality of single camera person trackers 112 may be obtained by the multicamera track association subsystem 114, and each camera-specific track 411 may be compared to a collection of global tracks 504 stored for a time period. For example, the collection of global tracks 504 may provide a sliding window of candidate tracks to which each received camera-specific track 411 may be linked. In some examples, the multicamera track association subsystem 114 use a visual feature matching algorithm to match visual features 412. In some examples, the multicamera association subsystem 114 may further use time and distance information to determine a correlation between a camera-specific track 411 and a global track 504, for example, to determine whether a person 101 could be detected in both the camera-specific track 411 and the global track 504 given the timestamps of the video frames and known distances and/or adjacencies between regions in the cameras' fields of view. As another example, the time and distance information may be used to determine whether a person 101 could be detected in multiple camera-specific tracks 411 associated with a same camera 102, such as to resolve a situation where a person 101 may be obstructed from view of the camera 102 for a time period or out of the field of view of any camera 102 for a time period.

If a determination is made that a particular camera-specific track 411 and a global track 504 match, at OPERATION 608, the camera-specific track 411 may be added to the global track 504 by assigning a global ID to the camera-specific track 411 that matches the global ID of the global track 504. If the camera-specific track 411 does not match any existing global tracks 504, the matching limit may be reached, and a new ID may be added to the global track collection including the local track.

At DECISION OPERATION 610, based on a configurable expiration time (M) assigned to the global track 504 when an update is made to it (e.g., including creation of the global track 504), a determination may be made whether to remove the global track 504 from the collection and to store the global track 504 to a large data store 518. For example, when the expiration time (M) has passed since a last update of the global track 504, the global track 504 may be expired and removed from the collection of global tracks and features, and written to the large data store 518 at OPERATION 612. Global tracks 504 that have not expired may remain in the collection and serve as candidates to be matched with additionally obtained camera-specific tracks 411 in real time or near-real time.

At OPERATION 614, linked tracks (i.e., global tracks 504 stored in the large data store 518) may be analyzed by one or more analytics applications 118. For example, the one or more analytics applications 118 may determine a trajectory of a person 101 through a location 111 and plot an overlay of that person's trip through the location 111 on the map. This information may be used, for example, to optimize store layout, asset protection purposes, for counting a number of people at the location 111 at a given time (e.g., for understanding busy hours of the location 111), determining whether social distancing or other health and/or safety measures may be in compliance, etc.

Figure 7:
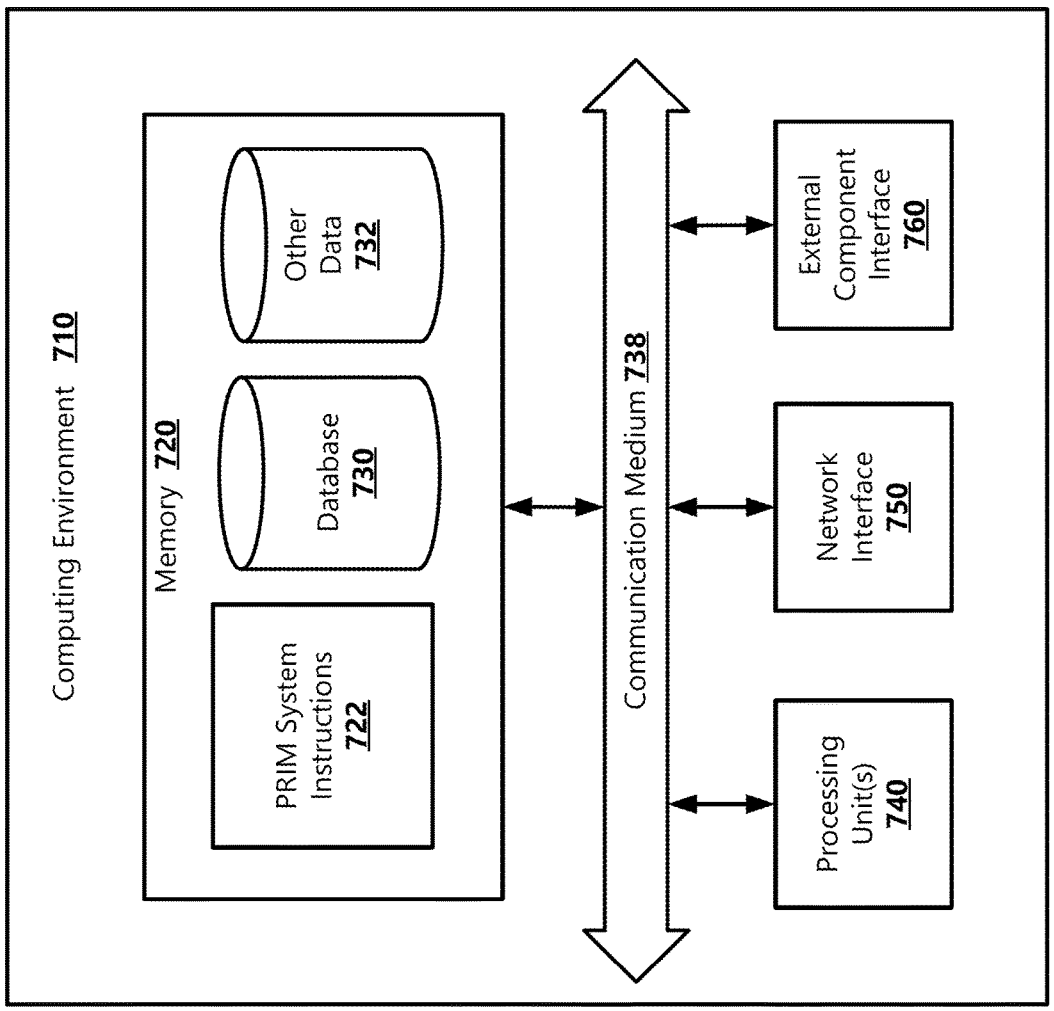
FIG. 7 is an illustration of an example computing system with which aspects of the present disclosure may be implemented.

FIG. 7 illustrates an example computing system 700 with which aspects of the present disclosure may be implemented. In an example, one or more components of the PRIT system 100 can be implemented as one or more systems 700 or one or more systems having one or more components of systems 700. In an example, the system 700 can include a computing environment 710. The computing environment 710 can be a physical computing environment, a virtualized computing environment, or a combination thereof. The computing environment 710 can include memory 720, a communication medium 738, one or more processing units 740, a network interface 750, and an external component interface 760.

The memory 720 can include a computer readable storage medium. The computer storage medium can be a device or article of manufacture that stores data and/or computer-executable instructions. The memory 720 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 720 can store various types of data and software. For example, as illustrated, the memory 720 includes instructions 722 for implementing one or more processes described herein (e.g., as described in relation to FIGS. 1-6), database 730, as well as other data 732. In some examples (e.g., where the computing environment 710 is the PRIT system 100), the memory 720 can include instructions for, in real time or near-real time: obtaining image data 201 from a first camera 102 of a plurality of cameras 102 at a location 111, wherein the image data include a set of video frames captured by the first camera; detecting a person 101 in at least one of the video frames; creating bounding box 303 to include the detected person 101; tracking the bounding box 303 across the set of video frames captured by the first camera 102; storing the tracked bounding boxes 303 and information associated with the tracked bounding boxes as a camera-specific track 411; determining whether the camera-specific track 411 matches a global track 504 comprised of one or more other camera-specific tracks captured by at least one of the plurality of cameras 102 at the location 111; when the camera-specific track 411 matches a global track 504, linking the camera-specific track 411 to the global track 504 and reset an expiration time associated with the global track 504; and when the camera-specific track 411 does not match a global track 504, creating a new global track 504 and setting the expiration time for the new global track; and when the expiration time is expired, storing the global track 504 in a large data store 518, for example, where one or more analytics applications 118 may access the stored global track 504 for generating insights that may be evaluated and used for security, safety, or various business-related improvements to the location 111.

The communication medium 738 can facilitate communication among the components of the computing environment 710. In an example, the communication medium 738 can facilitate communication among the memory 720, the one or more processing units 740, the network interface 750, and the external component interface 760. The communication medium 738 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communication medium.

The one or more processing units 740 can include physical or virtual units that selectively execute software instructions. In an example, the one or more processing units 740 can be physical products comprising one or more integrated circuits. The one or more processing units 740 can be implemented as one or more processing cores. In another example, one or more processing units 740 are implemented as one or more separate microprocessors. In yet another example embodiment, the one or more processing units 740 can include an application-specific integrated circuit (ASIC) that provides specific functionality. In yet another example, the one or more processing units 740 provide specific functionality by using an ASIC and by executing computer-executable instructions.

The network interface 750 enables the computing environment 710 to send and receive data from a communication network. The network interface 750 can be implemented as an Ethernet interface, a token-ring network interface, a fiber optic network interface, a wireless network interface (e.g., WI-FI), or another type of network interface.

The external component interface 760 enables the computing environment 710 to communicate with external devices. For example, the external component interface 760 can be a USB interface, Thunderbolt interface, a Lightning interface, a serial port interface, a parallel port interface, a PS/2 interface, and/or another type of interface that enables the computing environment 710 to communicate with external devices. In various embodiments, the external component interface 760 enables the computing environment 710 to communicate with various external components, such as external storage devices, input devices, speakers, modems, media player docks, other computing devices, scanners, digital cameras, and fingerprint readers.

Although illustrated as being components of a single computing environment 710, the components of the computing environment 710 can be spread across multiple computing environments 710. For example, one or more of instructions or data stored on the memory 720 may be stored partially or entirely in a separate computing environment 710 that is accessed over a network.

Figure 8:
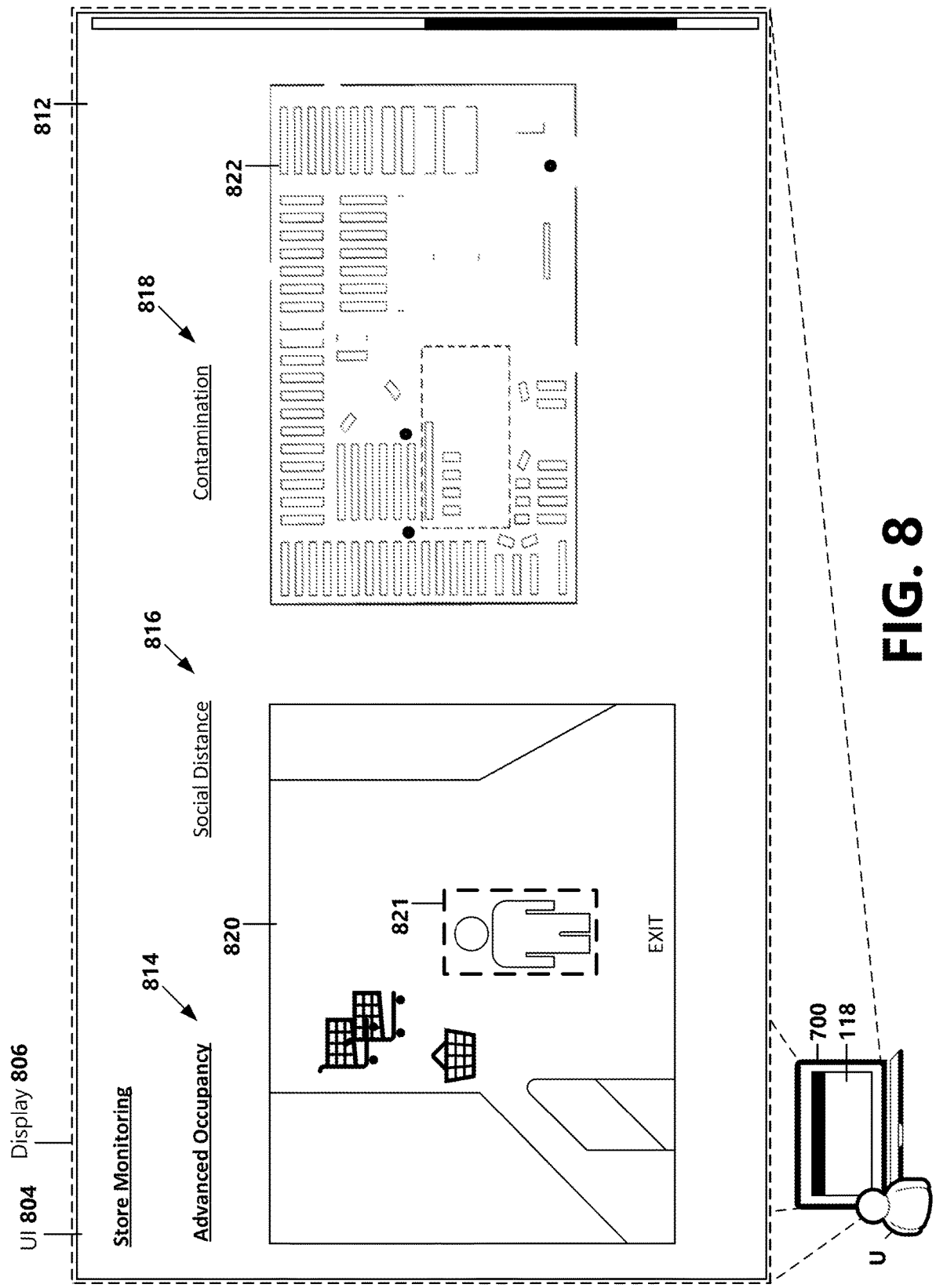
FIG. 8 illustrates an example user interface of an analytics application showing occupancy levels and locations within a retail location.

FIG. 8 illustrates an example user interface of an analytics application showing occupancy levels and locations within a retail location. In particular, a computing system 700 may host the analytics application 118, and present a user interface 804 to a user U. In particular, in the example shown, a store monitoring screen 812 is shown that includes a plurality of display panel types, such as an advanced occupancy panel 814, a social distancing panel 816, and a contamination panel 818. The user interface 804 seen in FIG. 8 displays the advanced occupancy panel 814 as the currently-active panel.

In the advanced occupancy panel 814, a video frame display screen 820 is presented, alongside a person location diagram 822. The video frame display screen 820 may present individuals appearing in frames captured by various cameras, and may include an object detection bounding box 821 around such a user. The person location diagram 822 may present a current or set of historical locations of individuals over time. Optionally, the person location diagram 822 includes captured user locations over time, with individual users appearing as dots within the person location diagram 822. Additionally, different individual users may appear within the person location diagram in different colors, with different icon types, etc.

Figure 9:
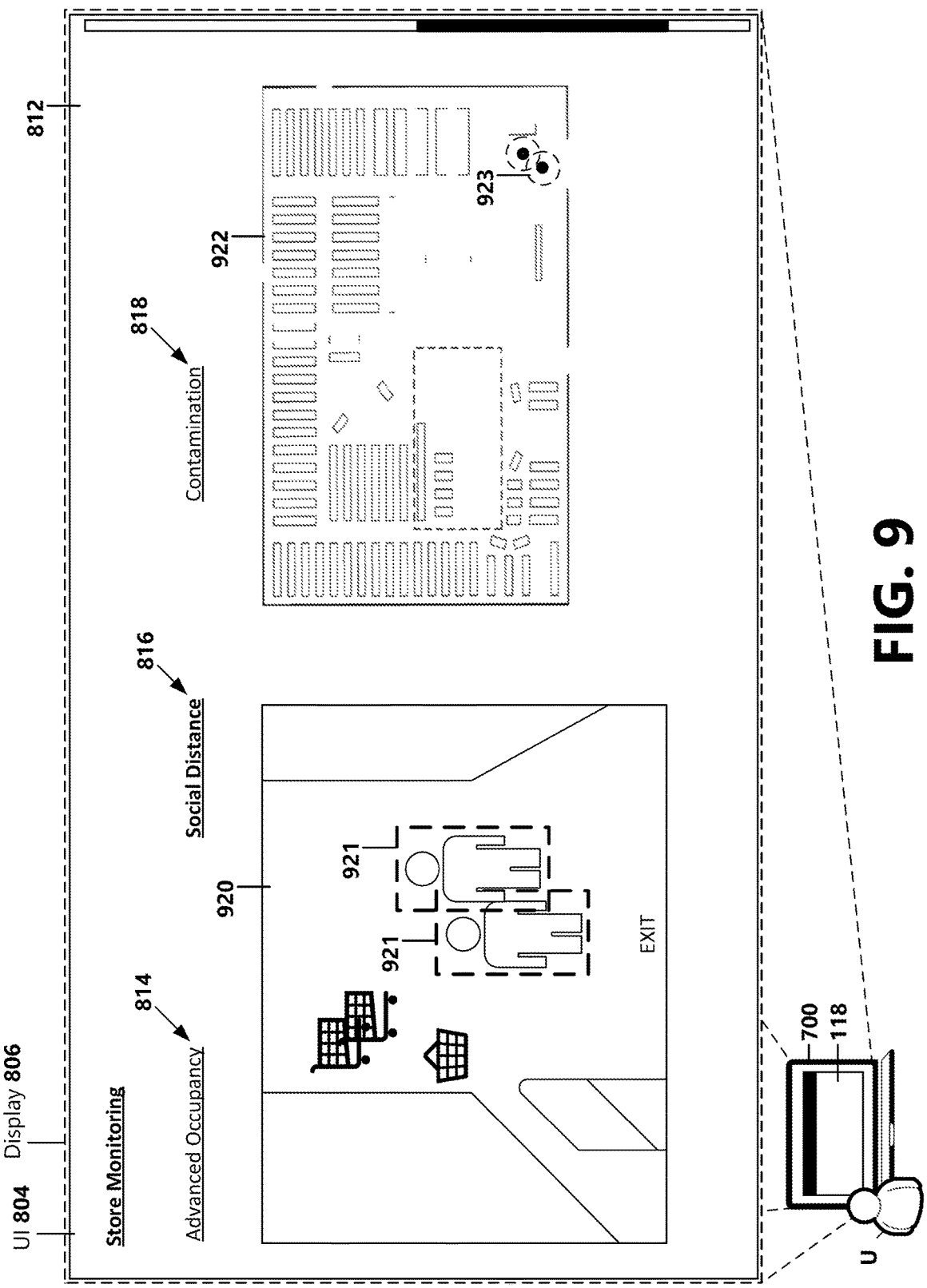
FIG. 9 illustrates an example user interface of an analytics application showing potential social distancing violations.

In FIG. 9 the store monitoring screen 812 is presented, but with the social distancing panel 816 being the currently active panel. In this instance, a similar video frame display screen 920 may be presented, with bounding boxes 921 around detected users. Within a person location diagram 922, each user location may be displayed, alongside a "halo" diameter 923 around each user that represents an appropriate social distancing from other users (e.g., approximately 6 feet). If two individuals are detected as being within the social distancing diameter of each other, optionally the bounding boxes and/or the halo diameter may change color to indicate a potential social distancing violation.

Figure 10:
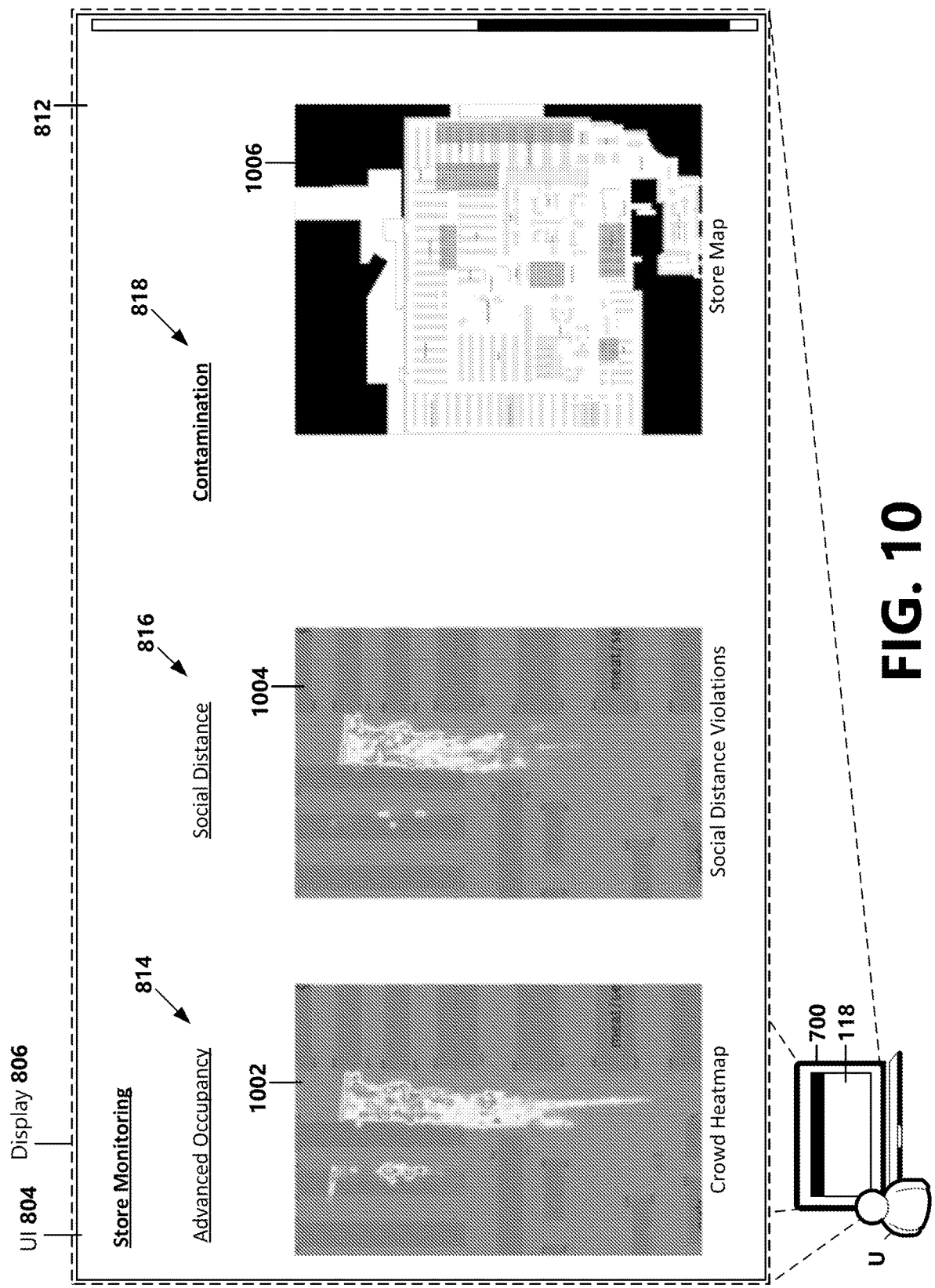
FIG. 10 illustrates an example user interface of an analytics application showing areas of potential contamination.

FIG. 10 illustrates an example user interface of an analytics application showing areas of potential contamination. Specifically, the store monitoring screen 812 is presented with the contamination panel 818 being the currently active panel. In this instance, a crowd heatmap 1002, a social distance violations heatmap 1004, and a store map 1006 are shown. The crowd heatmap 1002 shows a frequency of user presence in particular locations over a predetermined past period. The social distance violations heatmap 1004 displays locations of potential social distancing violations over the same predetermined past period. Finally, the store map 1006 illustrates a layout of the store, with highlighted areas 1007 that have high incidences of occupancy and/or social distancing violations to allow user U to determine whether to modify item layout, staffing levels (e.g., opening more checkout lanes), or otherwise adjusting operations of the retail location.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

We claim:
1. A system for providing person re-identification and tracking, comprising:
   at least one processor; and
   a memory coupled to the at least one processor, the memory including instructions that when executed by the at least one processor cause the system to:
      obtain image data from a first camera of a plurality of cameras at a location, wherein the image data include a set of video frames captured by the first camera;
      detect a person in at least one of the video frames;
      create a bounding box to include the detected person;
      track the bounding box across the set of video frames captured by the first camera;
      store the tracked bounding boxes and information associated with the tracked bounding boxes as a camera-specific track;
      determine whether the camera-specific track matches a global track comprised of one or more other camera-specific tracks captured by at least one of the plurality of cameras at the location by:
         determining a first time stamp of a first video frame within the camera-specific track and first coordinates of a first bounding box within the first video frame within the camera-specific track;
         determining a second time stamp of a second video frame within the global track and second coordinates of a second bounding box within the global track; and
         based on a predicted speed of the person and the distance between the first coordinates and the second coordinates, determining whether a same person can be detected within the first video frame at the first time stamp and the second video frame at the second time stamp;
      upon determining that the same person can be detected within the first video frame at the first time stamp and the second video frame at the second time stamp, link the camera-specific track to the global track and reset an expiration time associated with the global track, wherein the global track is obtained from a second camera of the plurality of cameras at the location and wherein the first camera and the second camera have non-overlapping fields of view; and
      upon determining that the same person cannot be detected within the first video frame at the first time stamp and the second video frame at the second time stamp, create a new global track and set the expiration time for the new global track; and
      when the expiration time is expired, store the global track in a data store.

2. The system of claim 1, wherein the information associated with the tracked bounding boxes include, for each bounding box:
   an identification of the video frame in which the person is detected;
   coordinates of the bounding box in the video frame;
   an identification of the camera from which the image data is obtained; and
   a time stamp of the video frame.

3. The system of claim 1, wherein in determining whether the camera-specific track matches a global track, the system is operative to match at least a subset of visual features between the camera-specific track and the global track.

4. The system of claim 1, wherein the system further includes a switch module operative to alternate processing of the set of video frames between an object detector and an object tracker to optimize processing time and tracking accuracy.

5. The system of claim 1, wherein the system is further operative to:
   access the global track;
   evaluate the global track and the information associated with the tracked bounding boxes; and
   determine a trajectory of the detected person.

6. The system of claim 5, wherein the system is further operative to overlay the trajectory on a map of the location.

7. The system of claim 6, wherein the system is further operative to perform analytics on at least one of:
   the trajectory; and
   the overlay of the trajectory on the map.

8. A method of providing person re-identification and tracking comprising:
   obtaining image data from a first camera of a plurality of cameras at a location, wherein the image data include a set of video frames captured by the first camera;
   detecting a person in at least one of the video frames;
   creating a bounding box to include the detected person;
   tracking the bounding box across the set of video frames captured by the first camera;
   storing the tracked bounding boxes and information associated with the tracked bounding boxes as a camera-specific track;
   determining whether the camera-specific track matches a global track comprised of one or more other camera-specific tracks captured by at least one of the plurality of cameras at the location by:
      determining a first time stamp of a first video frame within the camera-specific track and first coordinates of a first bounding box within the first video frame within the camera-specific track;
      determining a second time stamp of a second video frame within the global track and second coordinates of a second bounding box within the global track; and
      based on a predicted speed of the person and the distance between the first coordinates and the second coordinates, determining whether a same person can be detected within the first video frame at the first time stamp and the second video frame at the second time stamp;
   upon determining that the same person can be detected within the first video frame at the first time stamp and the second video frame at the second time stamp, linking the camera-specific track to the global track and resetting an expiration time associated with the global track, wherein the global track is obtained by a second camera of the plurality of cameras at the location and wherein the first camera and the second camera have non-overlapping fields of view; and
   upon determining that the same person cannot be detected within the first video frame at the first time stamp and the second video frame at the second time stamp, creating a new global track and setting the expiration time for the new global track; and
   when the expiration time is expired, storing the global track in a data store.

9. The method of claim 8, wherein determining whether the camera-specific track matches a global track comprises matching at least a subset of visual features between the camera-specific track and the global track.

10. The method of claim 8, further comprising using a switch module to alternate processing of the set of video frames between an object detector and an object tracker to optimize processing time and tracking accuracy.

11. The method of claim 8, further comprising:
accessing the stored global track;
evaluating the global track and the information associated with the tracked bounding boxes; and
determining a trajectory of the detected person.

12. The method of claim 11, further comprising overlaying the trajectory on a map of the location.

13. The method of claim 12, further comprising performing analytics on at least one of:
the trajectory; and
the overlay of the trajectory on the map.

14. A computer readable storage device that includes executable instructions which, when executed by a processor, cause the processor to perform:
obtaining image data from a first camera of a plurality of cameras at a location, wherein the image data include a set of video frames captured by the first camera;
detecting a person in at least one of the video frames;
creating a bounding box to include the detected person;
tracking the bounding box across the set of video frames captured by the first camera;
storing the tracked bounding boxes and information associated with the tracked bounding boxes as a camera-specific track;
determining whether the camera-specific track matches a global track comprised of one or more other camera-specific tracks captured by at least one of the plurality of cameras at the location by:
determining a first time stamp of a first video frame within the camera-specific track and first coordinates of a first bounding box within the first video frame within the camera-specific track;
determining a second time stamp of a second video frame within the global track and second coordinates of a second bounding box within the global track; and
based on a predicted speed of the person and the distance between the first coordinates and the second coordinates, determining whether a same person can be detected within the first video frame at the first time stamp and the second video frame at the second time stamp;
upon determining that the same person can be detected within the first video frame at the first time stamp and the second video frame at the second time stamp, linking the camera-specific track to the global track and resetting an expiration time associated with the global track, wherein the global trac is obtained from a second camera of the plurality of cameras at the location and wherein the first camera and the second camera have non-overlapping fields of view; and
upon determining that the same person cannot be detected within the first video frame at the first time stamp and the second video frame at the second time stamp, creating a new global track and setting the expiration time for the new global track; and
when the expiration time is expired, storing the global track in a data store.

15. The computer readable storage device of claim 14, wherein the instructions further cause the processor to display a user interface of an analytics application, the user interface presenting one or more of an occupancy map, a social distancing violation heatmap, or a contamination screen including a store map depicting one or more areas of occupancy and/or social distancing violations.

16. The computer readable storage device of claim 14, wherein determining whether the camera-specific track matches a global track comprises matching at least a subset of visual features between the camera-specific track and the global track.

17. The computer readable storage device of claim 16, wherein the visual features include one or more of a facial appearance of the detected person or apparel worn by the detected person.

18. The computer readable storage device of claim 17, wherein creating a bounding box around the detected person is based on an automated object detection algorithm, and wherein the visual features are determined based on an image within the bounding box.

* * * * *